United States Patent [19]

Allen et al.

[11] Patent Number: 4,815,320

[45] Date of Patent: Mar. 28, 1989

[54] INERTIA SENSOR

[75] Inventors: Peter D. Allen, Reading; Peter R. Jackman, Hants, both of England

[73] Assignee: First Inertia Switch Limited, England

[21] Appl. No.: 48,510

[22] Filed: May 4, 1987

[51] Int. Cl.[4] ............ G01P 15/02

[52] U.S. Cl. ............ 73/517 R

[58] Field of Search ............ 73/517 R; 200/61.45 R, 200/61.52, 61.53, 61.58; 280/735; 180/282; 307/105 B, 10 R, 121

[56] References Cited

U.S. PATENT DOCUMENTS

| | | | |
|---|---|---|---|
| 3,108,252 | 10/1963 | Torres | 200/61.53 |
| 3,332,060 | 7/1967 | Liljequist | 200/61.45 R |
| 3,348,844 | 10/1967 | Lemelson | 200/61.11 |
| 3,470,501 | 9/1969 | Riley | 200/61.53 |

*Primary Examiner*—Stewart J. Levy
*Assistant Examiner*—Robert P. Bell
*Attorney, Agent, or Firm*—Lowe, Price, LeBlanc, Becker & Shur

[57] ABSTRACT

An inertia body moves from a rest position in response to an applied acceleration and in so doing operates an electrical switch remote from the rest position. The body moves on spaced rails of a track arranged in a plane, with an aperture between the rails so that the body can extend below the running surfaces of the rails. The plane may be inclined and/or the rails may be non-parallel so that the center of gravity of the body rises as it moves from the rest position.

6 Claims, 2 Drawing Sheets

INERTIA SENSOR

BACKGROUND ART

An inertia sensor may comprise an inertia body which moves in response to accelerations and in moving makes or breaks an electrical contact. The contact can be connected in an electrical circuit whose state is changed in response to the making or breaking of the contact.

DISCLOSURE OF THE INVENTION

According to the invention there is provided an inertia sensor comprising a track arranged in a plane, an inertia body supported on the track, the track providing a rest position for the inertia body, the body travelling along the track from the rest position in response to acceleration of the sensor above a pre-determined level to operate an electrical switch at a position along the track spaced from the rest position, the track comprising a pair of rails having running surfaces for supporting the inertia body at spaced locations thereon with a space between the rails to allow the body to extend below the running surface of the rails.

BRIEF DESCRIPTION OF THE DRAWINGS

Examples of the invention will now be described with reference to the accompanying drawings in which.

BEST MODE FOR CARRYING OUT THE INVENTION

Figure 1:
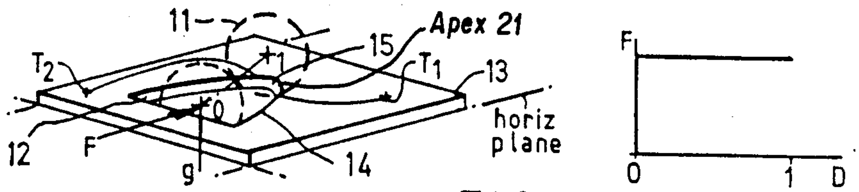
FIGS. 1–5 show different arrangements of inertia body and tracks and their corresponding force/distance relationships.

In each of FIGS. 1 to 5, an inertia mass 11 is supported by a track having rails formed by the edges of an aperture 12 in a supporting plate 13. The inertia mass 11 is a sphere of conducting metal and extends below the running surface of the rails. When the rails are non-parallel and/or non-horizontal, the center of gravity of the sphere rises as it travels along the track towards its narrower/higher (downstream) end. The rails are provided each with a contact strip 15 adjacent one end and stopping short of the other end, so that contact between the two edge strips is made or broken as the sphere rolls from one end of the aperture to the other. A make switch has the strip 15 at the downstream end, a break switch at the upstream end in relation to the direction of acceleration to be sensed. The upstream end is the rest position of the inertia body, to which it is biassed by gravity. The plate 13 preferably forms the substrate of a printed circuit board forming the electrical circuit responsive to the electrical contact which is made or broken, thus providing a compact arrangement with negligible electrical loss or interference. Terminals $T_1$, $T_2$ are shown diagramatically on the plate 13, connected to the strips 15.

The aperture 12 is shaped to give a desired restraining force/distance relationship. If the product of mass and acceleration to which the sensor is subjected exceeds the restraining force due to gravity, the sphere 11 will continue to roll to the downstream end of the track 14 and so will eventually make or break the electrical connection between the edge contact strips.

Figure 2:
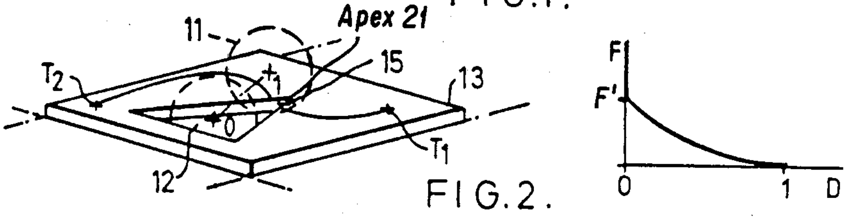

The plate 13 may be horizontal as shown in FIGS. 1 and 2, in which case, to give a uniform force/distance relationship the aperture has to be parabolic, with its axis aligned with the direction of acceleration and its apex 21 at the downstream end, as shown in FIG. 1. To give a decreasing force/distance relationship, a trianglar aperture is provided, again with its apex 21 at the downstream end, as shown in FIG. 2. With this arrangement, the sphere 11 will start rolling when the applied force exceeds the initial value F′ in the curve of FIG. 2; and will continue rolling provided that the applied force continues to exceed the decreasing value of F corresponding to the instantaneous position of the sphere in the curve of FIG. 2 as the sphere rolls along the aperture. If the applied force is uniform, an avalanche effect is produced as soon as the applied force exceeds the initial force value F′, since the restraining force drops off with distance.

Figure 3:
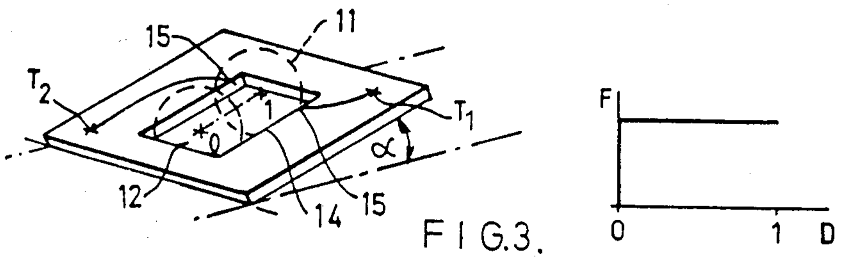
Figure 4:
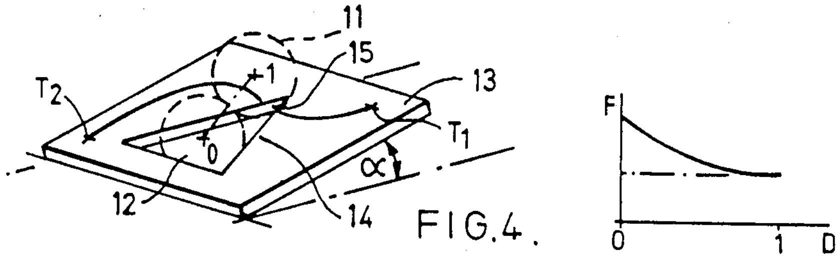
Figure 5:
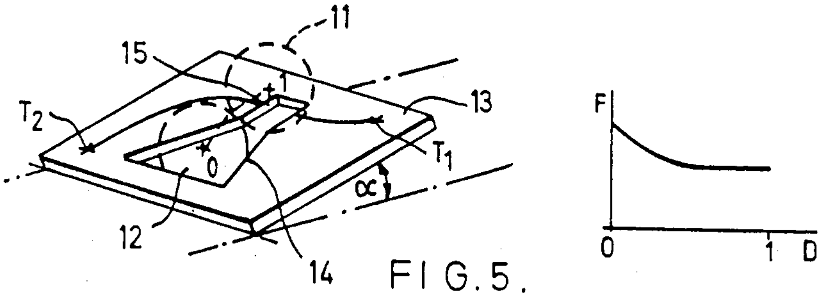

FIGS. 3 to 5 show plates inclined upwardly at an angle $\alpha$ to the horizontal, a typical value of angle $\alpha$ being in the range 31.4 plus or minus 2.5 degrees in the direction of acceleration to be sensed. The restraining force is affected by this inclination as well as the spacing variations of the aperture edges. FIG. 3 provides a uniform force/distance relationship, similar to that of FIG. 1, with a rectangular aperture. FIG. 4 shows a triangle aperture which gives a relationship asymptotically decreasing to a minimum non-zero value. FIG. 5 shows an aperture which changes from triangular to rectangular to provide a relationship which changes from the initial part of that of FIG. 4 to a uniform final value. The arrangement of FIG. 5 is preferred.

A typical acceleration which will cause the switch to be activated is 0.61 g plus or minus 0.06 g.

Figure 6:
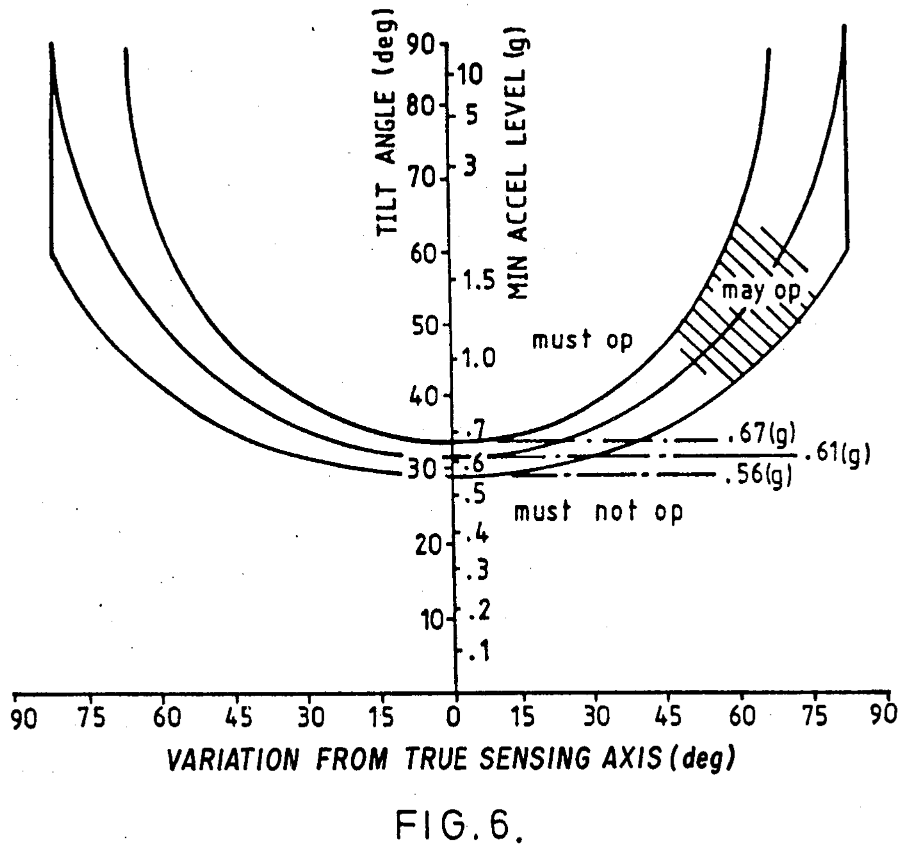
FIG. 6 shows the response of a typical sensor to sideways accelerations.

FIG. 6 shows the variation of response to forward decelaration on the right axis and the required inclination of the plate on the left axis, when the sensor is mounted at an angle to the forward direction that is, the horizontal components of the applied acceleration and the center-line of the track are inclined. The necessary applied forces and inclinations increase as the mounting axis varies from the forward direction to a no-response limiting value.

In one application, the sensor is mounted in a vehicle and accurately levelled, with the sensor axis aligned with the acceleration to be sensed—i.e., the downstream direction of the sensor is the direction of forward travel of the vehicle. An inertia seat belt system has what is called a comfort latch which allows the belt to be loosened. The sensor forms part of a device which draws the belt in again as soon as the vehicle decelerates at over a given rate. The sensor is of the make type and when the switch is made, the circuit on the printed circuit board on the plate 13 activates a device, such as a solenoid which winds in the loose part of the belt, either directly or by releasing a spring.

The sensor may have a thermoplastic housing. The plate may be a reinforced expoxy resin. The contact strips may be of silver alloy or other precious metal.

The mounting of the sphere between the edges of the aperture gives the sensor some lateral stability. A typical sensor is immune to 0.3 g in this transverse direction and in the vertical direction. The sensor is also immune to cyclic variations of 0.3 g amplitude in the frequency range 20–20,000 Hz in the forward direction.

The sphere will return to its start position after the acceleration ceases.

It is possible for the electrical switch contacts to be located remote from the sphere and the rails, the switch being operated by impact of the sphere with an operating member at the downstream end of the track. The embodiments described above, however, provide a compact and convenient arrangement.

We claim:

1. An inertia sensor comprising a track arranged in a plane, an inertia body supported on the track, the track providing a rest position for the inertia body, the inertia body travelling along the track from the rest position in response to acceleration of the sensor above a predetermined level to operate an electrical switch at a position along the track spaced from the rest position, the track comprising a pair of rails having running surfaces for supporting the inertia body at spaced locations thereon with an aperture between the rails to allow the inertia body to extend below the running surface of the rails, wherein the rails are formed on the edges of said aperture in a plane plate defining said plane.

2. A sensor as claimed in claim 1, wherein said plate comprises a printed circuit board, connections to said electrical switch being formed in said printed circuit board.

3. A sensor as claimed in claim 1, wherein said rails are non-parallel and converge with increasing distance from the rest position.

4. A sensor as claimed in claim 1, wherein said plane is inclined to the horizontal, the height of the rails increasing within increasing distance from the rest position.

5. An inertia sensor comprising a track arranged in a plane, an inertia body supported on the track, the track providing a rest position for the inertia body, the inertia body travelling along the track from the rest position in response to acceleration of the sensor above a predetermined level to operate an electrical switch at a position along the track spaced from the rest position, the track comprising a pair of rails having running surfaces for supporting the inertia body at spaced locations thereon with an aperture between the rails to allow the inertia body to extend below the running surface of the rails, wherein said plane is inclined to the horizontal such that the rails increase in height from the rest position and said rails converge from the rest position and have a final portion parallel.

6. A sensor as claimed in claim 1, wherein said inertia body is electrically conductive and said rails comprise an initial portion and a final portion, one of said intitial and final portions being electrically conductive and the other of said initial and final portions being electrically non-conductive, such that when the inertia body bridges the electrically conductive portions of the track, said electrical switch is made.

* * * * *

UNITED STATES PATENT AND TRADEMARK OFFICE
CERTIFICATE OF CORRECTION

PATENT NO. : 4,815,320

DATED : March 28, 1989

INVENTOR(S) : Peter D. ALLEN et al.

It is certified that error appears in the above-identified patent and that said Letters Patent is hereby corrected as shown below:

On the title page, after "[22] Filed: May 4, 1987", insert

--[30] Foreign Application Priority Data
May 2, 1986 (GB) United Kingdom .........8610828--

Signed and Sealed this

Seventeenth Day of October, 1989

Attest:

DONALD J. QUIGG

Attesting Officer

Commissioner of Patents and Trademarks